US012724274B2

(12) United States Patent
Strandborg

(10) Patent No.: US 12,724,274 B2
(45) Date of Patent: Sep. 1, 2026

(54) METHOD AND SYSTEM FOR COMPENSATING FOR GHOSTING ARTIFACTS IN DISPLAY APPARATUS

(71) Applicant: Varjo Technologies Oy, Helsinki (FI)

(72) Inventor: Mikko Strandborg, Hangonkylä (FI)

(73) Assignee: Varjo Technologies Oy, Helsinki (FI)

(*) Notice: Subject to any disclaimer, the term of this patent is extended or adjusted under 35 U.S.C. 154(b) by 206 days.

(21) Appl. No.: 18/760,767

(22) Filed: Jul. 1, 2024

(65) Prior Publication Data

US 2026/0003190 A1 Jan. 1, 2026

(51) Int. Cl.

| | |
|---|---|
| ***G02B 27/01*** | (2006.01) |
| ***G06F 3/01*** | (2006.01) |
| ***G06T 5/60*** | (2024.01) |
| ***G06T 5/70*** | (2024.01) |
| ***G06T 7/90*** | (2017.01) |
| ***G09G 3/00*** | (2006.01) |

(52) U.S. Cl.

CPC ............ *G02B 27/0172* (2013.01); *G06T 5/60* (2024.01); *G06T 5/70* (2024.01); *G06T 7/90* (2017.01); *G09G 3/001* (2013.01); *G02B 2027/011* (2013.01); *G02B 2027/014* (2013.01); *G06F 3/013* (2013.01); *G06T 2207/10024* (2013.01); *G06T 2207/20084* (2013.01); *G09G 2320/0242* (2013.01); *G09G 2340/00* (2013.01); *G09G 2354/00* (2013.01)

(58) Field of Classification Search

CPC ................ G06F 3/013; G02B 27/0172; G02B 2027/011; G02B 2027/014; G09G 3/001; G09G 2320/0242; G09G 2340/00; G09G 2354/00; G06T 5/60; G06T 5/70; G06T 7/90; G06T 19/006; G06T 2207/10024; G06T 2207/20084

USPC ........................................................... 345/589

See application file for complete search history.

(56) References Cited

U.S. PATENT DOCUMENTS

2022/0130297 A1* 4/2022 Vlachos ................ G06T 7/0004
2025/0104580 A1* 3/2025 Melax ..................... G06T 11/00

* cited by examiner

*Primary Examiner* — Jacinta M Crawford

(74) *Attorney, Agent, or Firm* — Ziegler IP Law Group, LLC.

(57) ABSTRACT

Disclosed is a method and a system for compensating for ghosting artifacts in a display apparatus. The method includes receiving an input image intended for display on a display panel within the display apparatus. The method further includes analyzing the input image to identify pixel regions susceptible to ghosting based on proximity to an optical axis of a lens unit in the display apparatus. The method further includes calculating a compensatory color value for each pixel in the identified pixel regions using a convolution process. The compensatory color value incorporates effects of light leakage from surrounding pixels on the corresponding pixel. The method further includes applying the compensatory color values to the corresponding pixels in the identified pixel regions for generating an adjusted image. The method further includes displaying the adjusted image on the display panel of the display apparatus.

13 Claims, 5 Drawing Sheets

METHOD AND SYSTEM FOR COMPENSATING FOR GHOSTING ARTIFACTS IN DISPLAY APPARATUS

TECHNICAL FIELD

The present disclosure relates to ghosting artifact compensation in folded optical systems such as pancake optical systems. The present disclosure also relates to a method and a system for compensating for ghosting artifacts in a display apparatus.

BACKGROUND

Folded optical systems are optical systems where reflective components (such as prisms, polarizing filters, mirrors, and so on) that can fold light by reflecting of the light) are used. The folding of light allows creating a compact layout such that the layout is included in virtual reality (VR), augmented reality (AR), or mixed reality (MR)-based Head mounted displays (HMDs), smartphones, or portable electronic systems. The reflective components effectuate the folding by causing the light to be reflected (bounced) from their surfaces multiple times as the light propagates through an optical system. The multiple reflections allow reducing an actual length of the optical system while meeting desired focal length requirements and minimizing thickness of the optical system. Despite having a compact layout, the optical system may be capable of rendering high-quality images. Thus, the optical system may be used in devices where there is requirement of having a slimmer camera module, reducing size and weight of headsets, porting the devices, and so on. However, designing such optical systems may be complex and expensive. This is so because designers need to ensure precise alignment between the reflective components and a minuscule misalignment may lead to loss of performance. Furthermore, each reflection at a reflective component (such as a polarizing filter) may contribute to loss of light through leaking.

Such leakage of light leads to an appearance of ghosting and/or flaring artifacts in rendered images. For prevention/minimization of leakthrough (leakage) of light, high-quality materials, and coatings (which are usually expensive), may be used during manufacturing of the optical system. Despite the usage of high-quality materials and/or coatings, it has been observed that some portion of light leaks through the optical system.

Therefore, in the light of the foregoing discussion, there exists a need to overcome the aforementioned drawbacks.

SUMMARY

The aim of the present disclosure is to provide a method and a system for compensating for ghosting artifacts in a display apparatus. The aim of the present disclosure is achieved by computing compensatory color values for regions of an input image that are susceptible to be corrupted by ghosting artifacts. An application of the compensatory color values can compensate for actual ghosting artifacts that may be introduced at the regions by an optical system (due to leakage of light associated with those regions of the image that are surrounding the regions where the ghosting artifacts have been introduced). Based on the application of the compensatory color values on the input image, an adjusted output image may be obtained as output. Once the adjusted output image is displayed on the display apparatus, light from the display apparatus is focused such that the displayed image is viewed as if free from the ghosting artifacts. It may be noted that the ghosting artifacts may be introduced as light from the display apparatus is focused. However, these ghosting artifacts may be compensated based on the application of the compensatory color values on the input image. Advantageous features and additional implementations are set out in the appended dependent claims.

Throughout the description and claims of this specification, the words "comprise", "include", "have", and "contain" and variations of these words, for example "comprising" and "comprises", mean "including but not limited to", and do not exclude other components, items, integers, or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
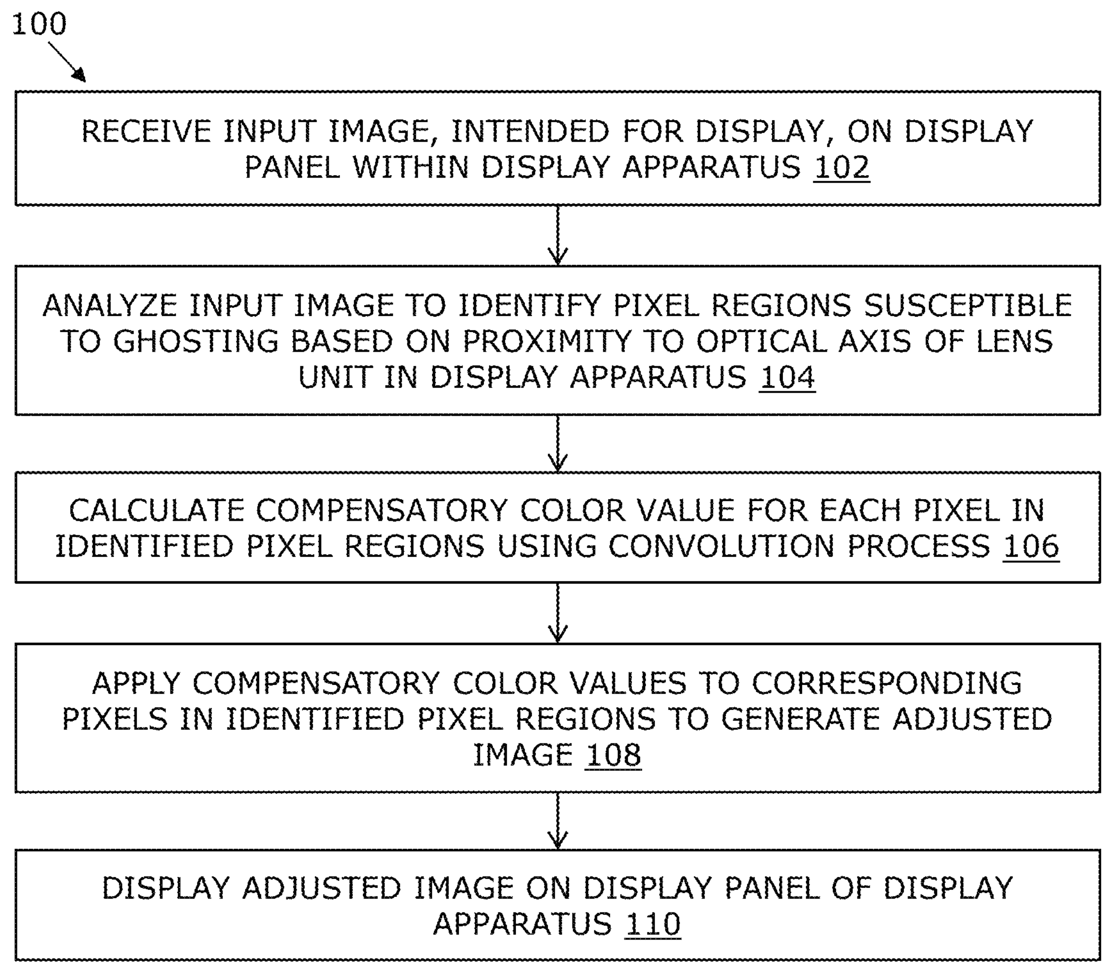
FIG. 1 is a flowchart that depicts steps of a method for compensating ghosting artifacts appearing in frames rendered by a display apparatus, in accordance with embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a method for compensating for ghosting artifacts in a display apparatus, the method comprising:

- receiving an input image intended for display on a display panel within the display apparatus;
- analyzing the input image to identify pixel regions susceptible to ghosting based on proximity to an optical axis of a lens unit in the display apparatus;
- calculating a compensatory color value for each pixel in the identified pixel regions using a convolution process, wherein the compensatory color value incorporates effects of light leakage from one or more surrounding pixels on the corresponding pixel;

applying the compensatory color values to the corresponding pixels in the identified pixel regions to generate an adjusted image; and displaying the adjusted image on the display panel of the display apparatus.

In a second aspect, the present disclosure provides a system for compensating for ghosting artifacts in a display apparatus, the display apparatus comprising a display panel configured to display an image and a lens unit configured to focus light from the display panel to a user's eye, the lens unit being characterized by an optical axis, the system comprising a processor configured to:

receive an input image intended for display on the display panel within the display apparatus;

analyze the input image to identify pixel regions susceptible to ghosting based on proximity to the optical axis of the lens unit in the display apparatus;

calculate a compensatory color value for each pixel in the identified pixel regions using a convolution process, wherein the compensatory color value incorporates effects of light leakage from one or more surrounding pixels on the corresponding pixel;

apply the compensatory color values to the corresponding pixels in the identified pixel regions to generate an adjusted image; and display the adjusted image on the display panel of the display apparatus.

The present disclosure provides the aforementioned method and the aforementioned system for compensating for ghosting artifacts in a display apparatus. The ghosting artifacts may appear when an image or frame rendered by the display panel of the display apparatus is visualized by a user. When the image/frame is rendered, the lens unit focusses light from the display plane to the user's eye. The light corresponds to colors associated with pixels in pixel regions of the image/frame. The user may view the ghosting artifacts based on a leakage of light through surfaces of reflective components of the lens unit as the light traverses through the lens unit and is focused onto the user's eye. These ghosting artifacts are compensated by preprocessing the input image that is intended for display. The preprocessing involves identifying the pixel regions in the input image that may be susceptible to being impacted by ghosting effect when the input image is rendered on the display panel and the lens unit focusses light associated with the pixel regions. The preprocessing also involves computing a compensatory color value for each pixel in each of the identified pixel regions.

The compensatory color value, computed for each pixel in each of the identified pixel regions, can be used for compensating the ghosting effect by adjusting colors associated with each of the identified pixel regions of the input image. The adjustment may result in the generation of the adjusted image. When the adjusted image is rendered on the display panel and the lens unit focusses light from the display panel (on which the adjusted image is rendered), there is a loss of energy due to leakage. The light may lose its energy when it is incident on the surfaces of the reflective components of the lens unit. The loss of energy may lead to the visualization of the adjusted image that is corrupted by ghosting artifacts. However, such visualization does not take place due to cancellation of the ghosting artifacts. The ghosting artifacts in the visualization (of the user) are eliminated by the adjustment of the colors associated with each of the identified pixel regions of the input image based on the compensatory color value computed for each pixel and the generation of the adjusted image based on adjustment of the colors. The rendering of the adjusted image on the display panel results in the user viewing an image, which may be close/similar to the input image. Thus, an effect of introduction of ghosting artifacts in a rendered image (when visualized by the user) can be eliminated based on computation of compensatory color values for pixels that may be susceptible to ghosting, generation of an adjusted image for an input image that is intended to be rendered, and rendering of the generated adjusted image.

In some scenarios, the adjustment of colors associated with each of the identified pixel regions of the input image needs to be such that, when viewed by the user, the colors associated with the identified pixel regions of the input image need to appear as dark. This may require obtaining compensatory color values for each pixel in each of the identified pixel regions that are negative. However, as negative light does not exist, the compensatory color values may be determined based on a distribution of brightness of pixels (contributing to ghosting), associated with regions that are surrounding each pixel in the identified regions, across other pixels in those regions of the input image that are close to edges of the input image. This is because the user's gaze is least likely to focus on the edges of a rendered image.

In an embodiment, the display apparatus is associated with the system that includes the processor. The user may visualize the display panel of the display apparatus through the naked eye and the light from the display panel is focused directly onto the eyes of the user. In another embodiment, the system (i.e., the processor) may be part of the display apparatus. The display apparatus may be a specialized equipment that is operable to present an extended-reality (XR) environment to the user. In some scenarios, the display apparatus may be a wearable device (such as a head-mounted display (HMD)) that may be worn by the user. Thus, the wearable device includes the display panel, the lens unit, and the processor. The system is operable to display or render images on the display panel, the lens unit is operable to focus light, associated with pixels of the rendered images, from the display panel into the user's eyes, and the processor is operable to control generation of the adjusted image, perform necessary computations for the generation of the adjusted image and render the adjusted image. The display apparatus, i.e., the wearable device, is implemented, for example, as an XR headset or a pair of XR glasses. The term "extended-reality" encompasses virtual reality (VR), augmented reality (AR), mixed reality (MR), and the like.

The display panel is a surface onto which visual content is rendered for viewing by the user. The display panel may employ display technologies such as Organic Light-Emitting Diode (OLED), Liquid Crystal Display (LCD), and the like, that are suited for compact and efficient display in the display apparatus. The display panel may be optimized for close viewing distances, ensuring that the visual content appears clear, sharp, and without pixelation, even when viewed from a very short distance. The characteristics of the display screen, such as resolution, refresh rate, color accuracy, and brightness, are tailored to enhance the overall visual experience in VR/AR applications, ensuring that the visual content appears as realistic and immersive as possible to the user.

The lens unit includes an arrangement of reflective components such as lenses, polarizers, phase retarders, and other optical elements designed to project light associated with pixels of images (such as the adjusted image), rendered on the display panel, from the display panel to the user's eyes. The lens unit is operatively coupled to the display panel. The reflective components function as a folding optical system, whereby light, projected from the display panel, is polarized (linearly and/or circularly) and folded based on reflection of the light from surfaces of the reflective components (such as the lenses, polarizers, phase retarders). Thereafter, the light is focused on the user's eyes. As the light is projected from the display panel to the user's eyes via the lens unit, the reflections may cause visualization of ghosting artifacts. However, visualization of the ghosting artifacts is prevented based on processing of the input image to be displayed. The preprocessing eliminates the ghosting artifacts such that the user's eyes are able to visualize an image that is similar/identical to the input image. The lens unit may magnify the displayed image from the display panel to fill the user's field of view, correcting for optical aberrations to maintain image clarity and fidelity, and ensure that the displayed image is focused properly for comfortable viewing over extended periods. The lens unit is operable to provide a wide field of view, accommodate a range of eye movements and positions, and minimize distortions.

The term "processor" refers to a processing unit that is operable to compensate for ghosting artifacts in the display apparatus based on an implementation of the processing steps, i.e., receiving the input image, analyzing the input image to identify pixel regions that are susceptible to ghosting, calculating the compensatory color value for each pixel in the identified pixel regions using the convolution process, applying the calculated compensatory color values to the corresponding pixels in the identified pixel regions to generate the adjusted image, and displaying the adjusted image on the display panel. Examples of implementation of the at least one of processor may include, but are not limited to, a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry. The processor is communicably coupled to the display screen.

The method comprises receiving the input image that is intended for display on the display panel within the display apparatus. Once the input image is received, it is analyzed to identify the pixel regions that could be susceptible to ghosting. The received input image includes a plurality of regions. The arrangement of the plurality of pixel regions may be such that a first pixel region includes the edges/corners of the input image and portions of the input image around the edges/corners. Further, a second pixel region includes a portion of the input image that is enclosed by the first pixel region. A third pixel region includes a portion of the input image that is enclosed by the first pixel region and the second pixel region. The final pixel region includes the center of the input image and portions of the input image around the center. The final pixel region is enclosed by all the other pixel regions of the plurality of pixel regions.

Each pixel in the input image is part of a geometric series of pixels that converges at an optical axis of the input image. Therefore, the pixel regions that are susceptible to ghosting can be identified based on the proximity of the pixel regions to the optical axis of the lens unit in the display apparatus. The optical axis refers to an imaginary line along which light propagates. The pixels in the geometric series belong to different pixel regions of the plurality of pixel regions. For example, a first pixel of the geometric series of pixels may belong to the first pixel region. Based on the analysis it may be determined that that pixels in the first pixel region are not susceptible to ghosting. For example, a pixel "A" (the first pixel) in the first pixel region of the input image may not be susceptible to ghosting. The colors associated with the pixels in the first pixel region, when displayed, may not be affected by ghosting. Furthermore, a second pixel of the geometric series of pixels may belong to the second pixel region, a third pixel of the geometric series of pixels may belong to the third pixel region, . . . , and an $N^{th}$ pixel of the geometric series of pixels may belong to the $N^{th}$ pixel region. The association of the first pixel, the second pixel, the third pixel, . . . , and the $N^{th}$ pixel as parts of the geometric series may be based on influence of color (light) associated with the first pixel on the second pixel, influence of color associated with the second pixel on the third pixel, . . . , and influence of color associated with an (N−1) th pixel of the geometric series on the $N^{th}$ pixel.

Based on the analysis it may be determined that that pixels in each of the second pixel region, the third pixel region, . . . , and the $N^{th}$ pixel region are susceptible to ghosting. Optionally, the analysis of the input image may involve determining a light leakage coefficient for each pixel region. The light leakage coefficient may represent a percentage of light leaking out of the lens unit (i.e., percentage of light energy lost due to reflection of light from surfaces of reflective components in the lens unit) to cause ghosting. Thus, a first light leakage coefficient is determined for pixels in the first pixel region. The pixels in the second pixel region are susceptible to ghosting based on leakage (due to reflection) of light (color) associated with pixels in the first region and the first light leakage coefficient. For example, a pixel "B" (the second pixel) may belong to the second pixel region of the input image. The pixel "B" is susceptible to ghosting based on leakage of colors associated with one or more pixels surrounding the pixel "A" (the first pixel). The colors associated with one or more pixels may leak through the lens unit. The extent (percentage) of leakage may be determined based on the first light leakage coefficient. Thus, light (color) associated with the pixel "B", displayed on the display panel, is influenced by the first light leakage coefficient and the colors associated with one or more pixels surrounding the pixel "A".

Similarly, a second light leakage coefficient is determined for the second pixel region. A pixel (such as the third pixel) belonging to the third pixel region is susceptible to ghosting based on leakage of light associated with pixels surrounding a pixel (such as the second pixels) in the second region and the second light leakage coefficient. This is because the third pixel region is surrounded by the second pixel region. The pixels (such as the $N^{th}$ pixel) in the $N^{th}$ pixel region are susceptible to ghosting based on leakage of light associated with pixels surrounding a $(N-1)^{th}$ pixel in the $(N-1)^{th}$ pixel region and the light leakage coefficient determined for the $(N-1)^{th}$ pixel region.

After the analysis of the input image and the identification of the pixel regions susceptible to ghosting, the compensatory color value for each pixel in each of the identified pixel regions of the input image is calculated using a convolution process. The calculation of the compensatory color value is essential for adjustment of color associated with each pixel in each of the identified pixel regions. The adjustment of the color enables compensation for ghosting artifacts that may affect each pixel in each of the identified pixel regions. The compensatory color value incorporates the effects of leakage of light (color) associated with one or more surrounding pixels onto color associated with the corresponding pixel. Each pixel in each of the identified pixel regions is affected by the leakage of light (color) associated with the one or more pixels. The one or more pixels may belong to pixel regions of the plurality of pixel regions that enclose a pixel region to which the corresponding pixel belongs.

Optionally, the convolution process, using which the compensatory color value is calculated for each pixel in each of the identified pixel regions, involves determining an effect of leaked light for each pixel from the one or more surrounding pixels. The calculation for each pixel may be based on a sum of original color value for the corresponding pixel as per the input image and a proportion of color values of the one or more surrounding pixels influenced by the light leakage coefficients thereof. For instance, calculation of the compensatory color value for a pixel in the second pixel region involves determining effects of leakage of light from one or more pixels in a surrounding pixel region, i.e., the first pixel region. The pixel in the second pixel region may be the second pixel in the geometric series of pixels and the one or more pixels in the first pixel region may be surrounding the first pixel in the geometric series of pixels.

Therefore, the effect of light (color) leaking from the one or more pixels in the first pixel region on the second pixel in the second pixel region can be expressed mathematically as a convolution of colors leaking from the one or more pixels (surrounding the first pixel) in the first pixel region. The first light leakage coefficient may represent the proportion of light (i.e., the color values) associated with the one or more pixels in the (surrounding) first pixel region that may be leaking. In accordance with an embodiment, the color associated with the second pixel in the second pixel region is expressed in equation (1) as follows:

$$D_2 = I_2 + k_1 * Conv(I_1) \tag{1}$$

Here, "$I_2$" is the original color value associated with the second pixel in the second pixel region of the input image, "Conv ($I_1$)" represents a convolution operation of the colors that are associated with the one or more pixels in the surrounding pixel region, i.e., the first pixel region, and "$k_1$" is the first light leakage coefficient. The colors associated with the one or more pixels in the first pixel region may leak through the lens unit if the input image is displayed on the display panel. This may result in the visualization of ghosting artifacts. Due to the leak, the color associated with the second pixel (i.e., $D_2$), as visualized by the user's eye, can be mathematically expressed as a summation of the original color associated with the second pixel (i.e., $I_2$) and a product of "$k_1$" and the convolution of the colors associated with the one or more pixels in the first pixel region.

Equation (1) indicates that color associated with pixels in the first pixel region has an impact on color associated with each pixel in the second pixel region (which is surrounded by the first pixel region). Similarly, the color value associated with a pixel in the $N^{th}$ pixel region (the innermost region of the input image) is expressed in equation (2) as follows:

$$D_N = I_N + k_{N-1} * Conv(I_{N-1}), \text{ if } n > 0 \tag{2}$$

Equation (2) indicates that the color associated with pixels in $(N-1)^{th}$ pixel regions will have an impact on the color (i.e., $I_N$) associated with the pixel in the $N^{th}$ pixel region of the input image if the input image is rendered on the display panel. The impact will be visualized as ghosting artifacts. Therefore, based on the equations (1) and (2), the processor calculates the compensatory color value for a pixel in an identified pixel region of the input image, as per equation (3), as follows:

$$C_{t+1} = -k_t * Conv(I_t) \quad t \in \{1, 2, \ldots, N-1\} \tag{3}$$

Here, "t"=1, 2, . . . , and N−1, correspond to the compensatory color values calculated for pixels in the second pixel region, the third pixel region, . . . , and the $N^{th}$ pixel region respectively in the input image. The pixels in each of the first pixel region, the second pixel region, the third pixel region, . . . , and the $N^{th}$ pixel region are part of a geometric series of pixels.

After the calculation of the compensatory color value for each pixel in each of the identified pixel regions (of the input image) susceptible to ghosting, the calculated compensatory color value is applied on each pixel in each of the identified pixel regions. Such application results in the adjustment of color associated with each pixel in each of the identified pixel regions such that an adjusted image is generated. Pixels in the adjusted image correspond to the pixels of the input image. Since the pixels in the first pixel region are not susceptible to ghosting, colors associated with the pixels of the first pixel region are not adjusted. Therefore, the pixels in the first pixel region of the input image are identical to pixels in a first region of the adjusted image. The color associated with each pixel in each of the identified pixel regions (i.e., the second pixel region, the third pixel region, . . . , and the $N^{th}$ pixel region in the input image) is adjusted (to generate the adjusted image), as indicated in equation (4), as follows:

$$A_{t+1} = I_{t+1} + C_{t+1} \tag{4}$$

Here, "t"=1, 2, . . . , and N−1, correspond to color associated with pixels in the second pixel region, the third pixel region, . . . , and the $N^{th}$ pixel region respectively of the adjusted image. The second pixel region, the third pixel region, . . . , and the $N^{th}$ pixel region of the adjusted image correspond to the second pixel region, the third pixel region, . . . , and the $N^{th}$ pixel region respectively of the input image. "$A_{t+1}$" is the color associated with a pixel in a particular pixel region in the adjusted image, "$I_{t+1}$" is the original color associated with the pixel in the particular pixel region in the input image, and "$C_{t+1}$" is the compensatory color value that is applied on the pixel for adjusting the color of the pixel.

The method further comprises displaying/rendering the adjusted image on the display panel of the display apparatus. Once the adjusted image is rendered, light from the display panel is focused by the lens unit into the user's eye. During the focusing, light (i.e., the color) associated with pixels in the adjusted image may leak due to reflection of the light on the surfaces of the reflective components of the lens unit. As discussed earlier, the colors associated with the pixels in the first pixel region of the adjusted image, when displayed, may not be affected by ghosting. The color associated with each pixel in each of the other pixel regions (i.e., the second pixel region, the third pixel region, . . . , and the $N^{th}$ pixel region) in the adjusted image is susceptible to ghosting based on leakage of colors (light) associated with one or more pixels in each pixel region that is surrounding the corresponding pixel regions in the adjusted image. The color associated with a pixel in the second pixel region of the adjusted image (i.e., "$F_2$"), as visualized by the user's eye, can be expressed using equation (5) as follows:

$$F_2 = A_2 + k_1 * Conv(I_1) \quad (5)$$

The pixel in the second pixel region of the adjusted image corresponds to the second pixel in the second pixel region in the input image. Here, "$A_2$" is the color associated with the pixel in the second pixel region, "Conv ($I_1$)" represents a convolution of colors that are associated with the one or more pixels in the first pixel region (surrounding the second pixel region) in the adjusted image, and "$k_1$" is the first light leakage coefficient (the light leakage coefficients for corresponding pixel regions of the input image and the adjusted image are identical). By substituting equation (4) and equation (3) in equation (5), the result obtained is "$F_2$"="$I_2$" (i.e., the original color value associated with the second pixel in the second pixel region). Similarly, color associated with a pixel in the $N^{th}$ pixel region of the adjusted image (i.e., "$F_N$"), as visualized by the user's eye, is equal to the color associated with a corresponding pixel in the $N^{th}$ pixel region (i.e., "$I_N$") of the input image. Thus, the image visualized by the user's eye is similar/identical to the received input image intended for display.

Thus, the generation of the adjusted image based on the identification of each pixel region of the input image that is susceptible to ghosting and the calculation of the compensatory color value of each pixel in each of the identified pixel regions, and the rendering of the adjusted image on the display panel enables compensating the effects of ghosting artifacts (which could have been visualized had the input image were rendered). In some scenarios, the calculated compensatory color values for pixels in the identified pixel regions in the input image may not exactly account for leakage of light (color) associated with corresponding pixels in the corresponding pixel regions in the adjusted image (when the adjusted image is rendered on the display panel). In such scenarios, "$F_2$"≠"$I_2$", "$F_3$"≠"$I_3$", . . . , and "$F_N$"≠"$I_N$". Thus, there is an existence of an error between the received input image intended for display and the adjusted image visualized by the user's eyes. Optionally, the adjusted image may be refined by repeating the convolution process and compensatory colour value calculation steps for multiple iterations. The iterations may be continued until a loss function (or a value of a cost function), indicative of a difference between the input image and the adjusted image, between consecutive iterations falls below a predefined threshold.

The loss function or the cost function may be dependent on a current compensatory colour value, a compensatory colour value calculated in a previous iteration, and an update factor. At each iteration, the loss/cost function may be minimized. Exemplary loss function/cost function used for updating the compensatory colour value may be a mean-square error function, signal-to-noise ratio function, or the like. The refinement of the adjusted image based on iterative updating of the compensatory color values results in obtaining a global minimum for the loss/cost function. At this stage, a refined adjusted image is obtained. The refined adjusted image may closely match the input image intended for display, and the refined adjusted image may be displayed on the display panel.

In an embodiment, the loss/cost function may be a weighted loss/cost function that is weighted based on user's gaze direction on the display panel. Optionally, the method further comprises prioritizing calculating and applying of the compensatory color values to the pixels corresponding to a user's gaze over peripheral regions. The calculation and application of the compensatory color value to each pixel in each of the identified pixel regions in the input image is prioritized based on a user's gaze. The priority of pixels in certain pixel regions of the adjusted image where the user's gaze is directed may be prioritized over pixels in those pixel regions that are displayed at the periphery of the display panel. The compensatory color values for those pixels where the user's gaze is likely to be directed (such as pixels in the $N^{th}$ pixel region or the $(N-1)^{th}$ pixel region of the adjusted image rendered at the center of the display panel) is associated with a higher weight in the loss function. On the other hand, pixels where the user's gaze is least likely to be directed (such as pixels in the first pixel region or second pixel region of the adjusted image rendered at the periphery of the display panel) are associated with a lower weight in the cost function. The weighted loss/cost function allows mitigating the impact of the ghosting on the pixels where the user's gaze is directed (or likely to be directed) at the expense of pixels at those pixel regions where the user's gaze is not directed (or least likely to be directed) without causing an additional perceivable color error associated with the pixels of the adjusted image.

The display apparatus may include a gaze-tracking system for tracking the gaze direction of the user. The gaze-tracking system is communicably coupled to the processor. The term "gaze-tracking system" refers to a specialized equipment for detecting and/or following the gaze of the user when the display apparatus is worn by the user. The gaze-tracking system could be implemented as contact lenses with sensors, cameras monitoring a position, a size and/or a shape of a pupil of a given eye of the user, and the like. The gaze-tracking system is configured to collect gaze-tracking data, which constitutes the information indicative of the gaze direction of the user. The gaze-tracking system sends the gaze-tracking data to the processor. The gaze-tracking data is collected repeatedly by the gaze-tracking system as the gaze of the user's eyes keeps changing whilst he/she views the display panel.

Optionally, non-visible areas of the display panel are masked to black. The non-visible areas refer to areas of the display panel where the user is least likely to direct his/her gaze (especially in the XR headsets). The processor may display/render colors associated with pixels in the first pixel region at the non-visible areas. The masking allows propagating errors in color associated with pixels at the pixel regions rendered at the center, where the user is likely to direct his/her gaze, to the pixels that are rendered at the non-visible areas.

Optionally, if the compensatory color value calculated for a pixel in a pixel series, including a sequence of pixels affected by each other due to propagation of light through the lens unit, results in a color outside of a displayable color range of the display panel, excess color values may be redistributed by increasing brightness of adjacent pixels within the same pixel series. The pixel series or the sequence of pixels may refer to the geometric series of pixels that converges at the optical axis of the input image. All pixels in the sequence of pixels, apart from the first pixel in the sequence of pixels (the geometric series), are affected by another pixel in the sequence of pixels. The pixels in the sequence of pixels may include the first pixel in the first pixel region, the second pixel in the second pixel region, . . . , and the $N^{th}$ pixel in the $N^{th}$ pixel region. The color associated with the first pixel may affect the color associated with the second pixel, the color associated with the second pixel may affect the color associated with the third pixel, . . . , and the color associated with the $(N-1)^{th}$ pixel may affect the color associated with the $N^{th}$ pixel.

Based on equation (3), if the compensatory color value ($C_{t+1}$) calculated for a pixel (such as the second pixel in the second pixel region (t=1), the third pixel in the third pixel region (t=2), . . . , and the $N^{th}$ pixel in the $N^{th}$ pixel region (t=N−1)) is a color that is outside the displayable color range of the display panel, then brightness (color) associated with pixels that follow the pixel in the geometric series can be increased. For example, if an intended color ("$F_3$") associated with the third pixel in the third pixel region (t=2) for visualization is fully black (i.e., (0, 0, 0) for Red-Green-Blue (RGB) color pattern), and the intended color ("$F_2$") associated with the second pixel in the second pixel region (t=1) for visualization is fully white (i.e., (1, 1, 1) for RGB color pattern), the compensatory color value ($C_3$) calculated for the third pixel needs to be $(-1, -1, -1)*k_2$. As per ideal scenario, "$F_3$" is equal to "$I_3$", i.e., the original color value associated with the third pixel in the third pixel region. Based on the application of the compensatory color value on the third pixel, the color associated with the third pixel ("$I_3$") is adjusted (as per equation (4)). The color associated with the third pixel ("$I_3$") may be adjusted as "$A_3$"="$C_3$" (which is "$(-1, -1, -1)*k_2$"). This is because "$I_3$" is fully black, i.e., (0, 0, 0).

Furthermore, due to leakage of color (light) associated with the second pixel in the second pixel region (surrounding the third pixel region), the third pixel becomes susceptible to ghosting. The ghosting results in an adjustment of the color associated with the third pixel (as per equation (5)) in the adjusted image such that color visualized by the user's eye is fully black (i.e., (0, 0, 0) for RGB color pattern). However, adjusting the color associated with the third pixel (i.e., $A_3$) as $(-1, -1, -1)*k_2$ may not be possible. This is because "$(-1, -1, -1)*k_2$" is outside the displayable color range of the display panel of the display apparatus. In this scenario, the brightness associated with the second pixel in the second pixel region (t=1) is offloaded (distributed) to the first pixel in the first pixel region that surrounds the second pixel region. This leads to propagation of color errors associated with pixels in pixel regions near the center of the input image or the adjusted image to pixels in pixel regions near the periphery of the input image or the adjusted image.

Optionally, a defocus blur may be applied sequentially across each of the identified pixel regions of the input image. The sequence of application of the defocus blur is aligned with pixel series, i.e., the geometric series of pixels. The geometric series of pixels includes a sequence of pixels that may be affected by each other due to propagation (i.e., leaking) of light through the lens unit (i.e., surfaces of the reflective components in the lens unit). The application of the defocus blur may start from a periphery towards a center of the display panel. The defocus blur may be initially applied on the second pixel region, followed by the third pixel region, . . . , and so on. Finally, the defocus blur may be applied on the $N^{th}$ pixel region. After the application of the defocus blur in each of the identified pixel regions of the input image, the calculation of the compensatory color value for each pixel in each of the identified pixel regions is initiated.

Optionally, a neural network is implemented for compensating ghosting artifacts in the display apparatus. The neural network may be operable to process pixels in each pixel series (without accounting for the defocus blur) independently to approximate the compensatory color value for each pixel in each of the identified pixel regions. The neural network is a network of artificial neurons programmed in software that simulates a human brain in terms of performing tasks such as processing images, videos, audio, texts, and so forth, and determining meanings from the images, videos, audio, and text. Typically, a neural network comprises a plurality of layers of nodes, viz., an input layer, one or more intermediate hidden layers, and an output layer, interconnected, for example in a feed-forward manner (i.e., flow in one direction only, from input to output). Examples of the neural network include, but may not be limited to, a fully connected multilayer perceptron that comprises a couple of layers or a convolutional neural network. In the present disclosure, the neural network is trained to perform a task of calculating the compensatory color value for each pixel in each of the identified pixel regions.

The neural network may be trained to adjust the colours associated with the pixels in the geometric series of pixels belonging to the plurality of pixel regions. The training data may constitute a set of input images and a set of adjusted images. The set of adjusted images are generated by adjusting colours associated with pixels of each input image of the set of input images based on compensatory color values that are calculated for the pixels of each input image. Based on the training, the neural network may approximate an impact of leakage of light at the lens unit and adjust its weights such that compensatory color values are calculated for pixels of an input image fed to the neural network during the inference stage.

In accordance with an embodiment, the input image may include multiple pixel sequences and each pixel sequence (i.e., geometric series of pixels) can be processed separately. In this embodiment, the neural network may be the fully connected multilayer perceptron. The fully connected multilayer perceptron may calculate the compensatory color value for each pixel of each geometric series of pixels in each of the identified pixel regions (starting from the second pixel region and ending at the $N^{th}$ pixel region). The fully connected multilayer perceptron does not account for the defocus blur. After calculation of the compensatory color value for each pixel of each geometric series of pixels, the fully connected multilayer perceptron may predict the colour adjustment for each pixel.

In accordance with another embodiment, the neural network may take into account the defocus blur. In this embodiment, the neural network may be the convolutional neural network. The convolutional neural network may process the entire input image. Since the defocus blur is taken into account, there is a requirement to access wider areas of the input image. The convolutional neural network perceptron may calculate the compensatory color value for each pixel in each of the identified pixel regions of the input image and predict the colour adjustment required for each pixel to compensate for the ghosting artifacts.

The present disclosure also relates to the second aspect as described above. Various embodiments and variants disclosed above, with respect to the aforementioned first aspect apply mutatis mutandis to the second aspect.

Optionally, the processor is further configured to refine the adjusted image by repeating the convolution process and compensatory color value calculation steps for multiple iterations, wherein the iterations are performed until a loss function between consecutive iterations falls below a predefined threshold.

Optionally, the processor is further configured to prioritize calculating and applying of the compensatory color values to the pixels corresponding to a user's gaze over peripheral regions.

Optionally, if the determined compensatory color value for a pixel in a pixel series, including a sequence of pixels affected by each other due to propagation of light through the lens unit, results in a color outside of a displayable color range of the display panel, the processor is further configured to redistribute excess color values by increasing a brightness of adjacent pixels within the same pixel series.

Optionally, the processor is further configured to apply a defocus blur sequentially across the identified pixel regions of the input image, aligned with pixel series, including a sequence of pixels affected by each other due to propagation of light through the lens unit, starting from a periphery towards a center of the display panel.

Optionally, the processor is further configured to implement a neural network configured to process each pixel series independently to approximate the compensatory color value for each pixel in the identified pixel regions.

Optionally, the display apparatus is an HMD as part of an XR system.

DETAILED DESCRIPTION OF THE DRAWINGS

Referring to FIG. 1, illustrated is a flowchart depicting steps of a method 100 for compensating ghosting artifacts appearing in frames rendered by a display apparatus, in accordance with embodiments of the present disclosure. At step 102, the method 100 includes receiving an input image that is intended for display on a display panel within the display apparatus. At step 104, the method 100 includes analyzing the input image to identify pixel regions susceptible to ghosting based on proximity to an optical axis of a lens unit in the display apparatus. At step 106, the method 100 includes calculating a compensatory color value for each pixel in the identified pixel regions using a convolution process. Herein, the compensatory color value incorporates effects of light leakage from one or more surrounding pixels on the corresponding pixel. At step 108, the method 100 includes applying the compensatory color values to the corresponding pixels in the identified pixel regions for generating an adjusted image. At step 110, the method 100 includes displaying the adjusted image on the display panel of the display apparatus.

The aforementioned steps are only illustrative, and other alternatives can also be provided where one or more steps are added, one or more steps are removed, or one or more steps are provided in a different sequence without departing from the scope of the claims herein.

Figure 2:
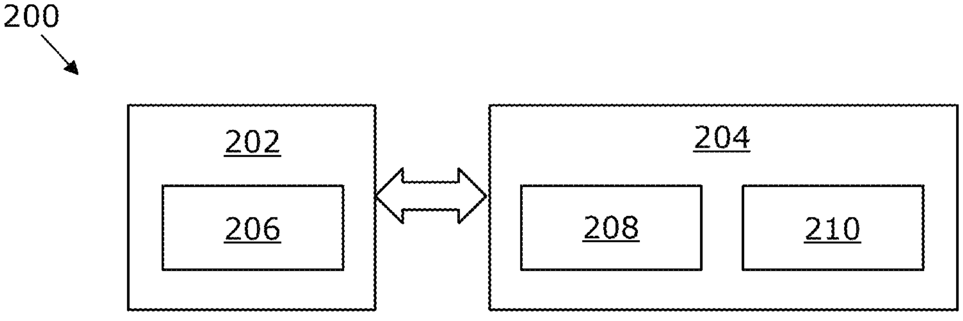
FIG. 2 is a schematic block diagram depicting an association of a system operable to compensate for ghosting artifacts and a display apparatus, in accordance with embodiments of the present disclosure.

Referring to FIG. 2, illustrated is a schematic block diagram 200 that depicts an association of a system 202 that is operable to compensate for ghosting artifacts and a display apparatus 204, in accordance with embodiments of the present disclosure. The system 202 includes a processor 206. The display apparatus 204 includes a display panel 208 and a lens unit 210. The system 202 may be operatively coupled to the display apparatus 204. The processor 206 is operable to receive an input image that is intended for display on the display panel 208 within the display apparatus 204, analyze the input image to identify pixel regions susceptible to ghosting based on proximity to the optical axis of the lens unit 210 in the display apparatus 204, calculate a compensatory color value for each pixel in the identified pixel regions using a convolution process, apply the compensatory color values to the corresponding pixels in the identified pixel regions to generate an adjusted image, and display the adjusted image on the display panel 208 of the display apparatus 204. The display panel 208 is configured to display an image (such as the adjusted image). The lens unit 210 is configured to focus light from the display panel 208 to a user's eye. The lens unit 210 is characterized by an optical axis. The lens unit 210 includes reflective components such as polarizers, lenses, phase retarders, and so on.

FIG. 2 is merely an example, which should not unduly limit the scope of the claims herein. A person who is skilled in the art may recognize many variations, alternatives, and modifications of embodiments of the present disclosure. For example, the system 202 may be part of or included in the display apparatus 204.

Figure 3A:
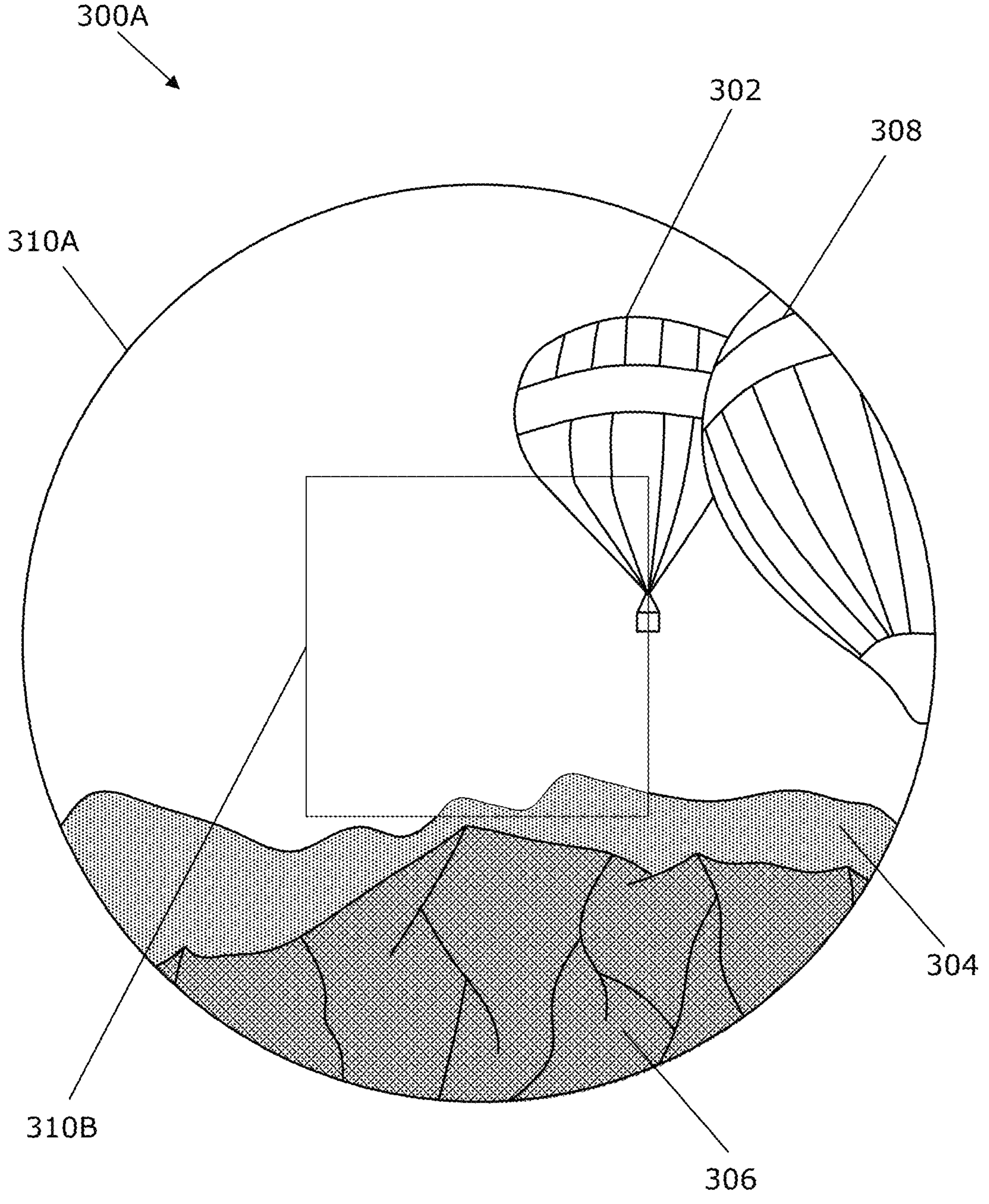
FIGS. 3A and 3B illustrate an exemplary image and an exemplary visualization of the exemplary image with ghosting artifacts respectively, in accordance with embodiments of the present disclosure.
Figure 3B:
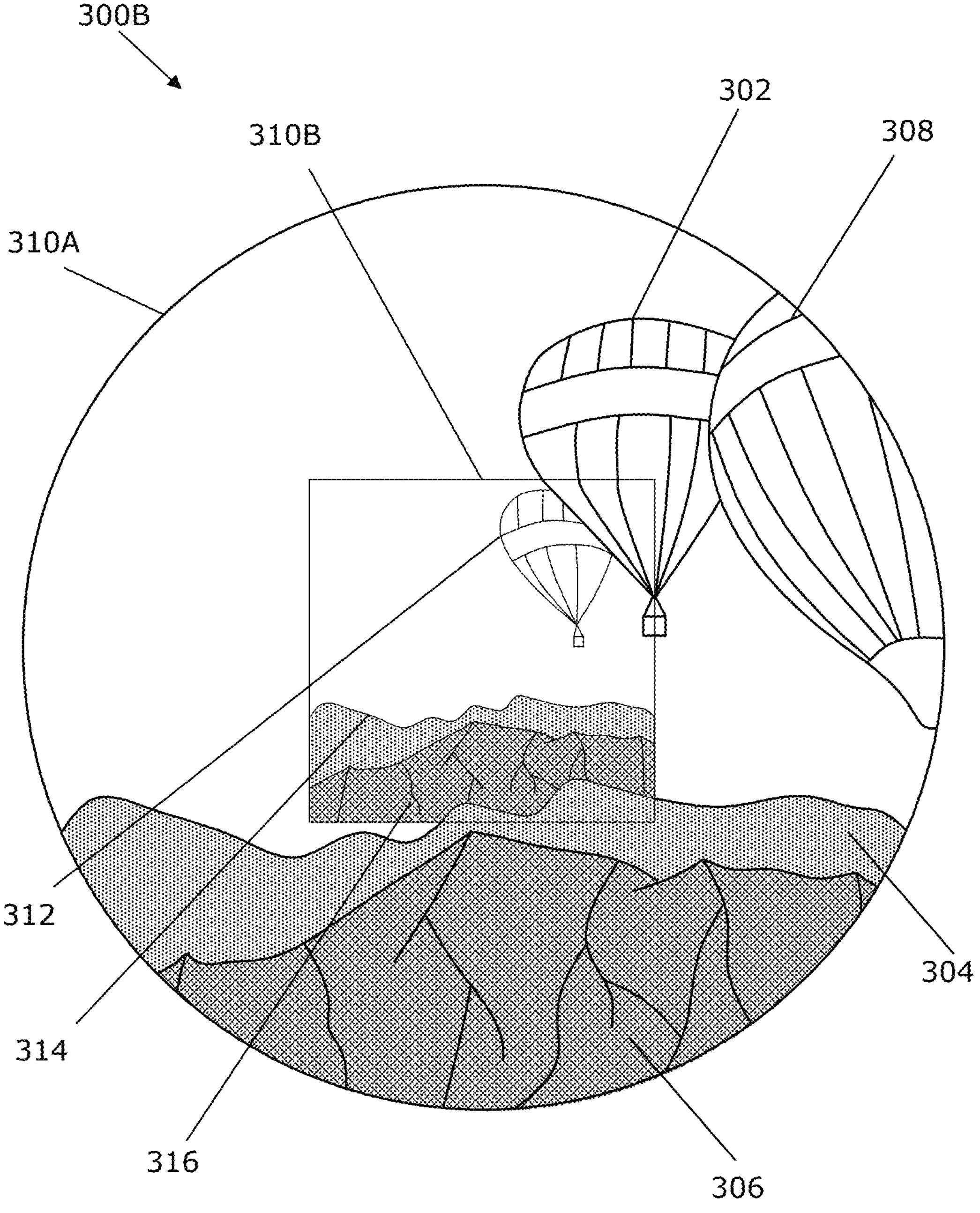

Referring to FIGS. 3A and 3B, illustrated are an exemplary image 300A and an exemplary visualization 300B of the image 300A with ghosting artifacts respectively, in accordance with embodiments of the present disclosure. As illustrated in FIG. 3A, the image 300A is intended for display on the display panel 208 within the display apparatus 204. The image 300A includes four objects, a first object 302 (for example, a first parachute), a second object 304 (for example, a first hill), a third object 306 (for example, a second hill), and a fourth object 308 (for example, a second parachute). The image 300A includes a couple of pixel regions, viz., a first pixel region 310A and a second pixel region 310B. The first pixel region 310A includes a set of first pixels and the second pixel region 310B includes a set of second pixels. The first pixels in the first pixel region 310A and the second pixels in the second pixel region 310B may belong to a geometric series of pixels. The second pixel region 310B is surrounded by the first pixel region 310A.

When the image 300A is rendered/displayed on the display panel 208, the lens unit 210 focusses light corresponding to colors associated with pixels in pixel regions of the image 300A. As illustrated in FIG. 3B, the focusing of the light allows the user to have the visualization 300B of the image 300A with ghosting artifacts. The user may view the ghosting artifacts in the second pixel region 310B. The ghosting artifacts may be visualized due to a leakage of light (i.e., color) associated with the first pixels in the first pixel region 310A) at surfaces of reflective components of the lens unit 210 as the light traverses through the lens unit 210 and is focused on the user's eye. The first pixels are associated with the first object 302 (the first parachute), the second object 304 (the second parachute), and the third object 306 (the first hill). The leakage modifies colors associated with the second pixels in the second pixel region 310B causing the visualization of the ghosting artifacts comprising a portion 312 of the first object 302, a portion 314 of the second object 304, and a portion 316 of the third object 306. The second pixels may follow the first pixels in a geometric series of pixels. An extent of the modification of the colors associated with the second pixels may be dependent on a light leakage coefficient determined for the first pixels in the first pixel region 310A.

Figure 4:
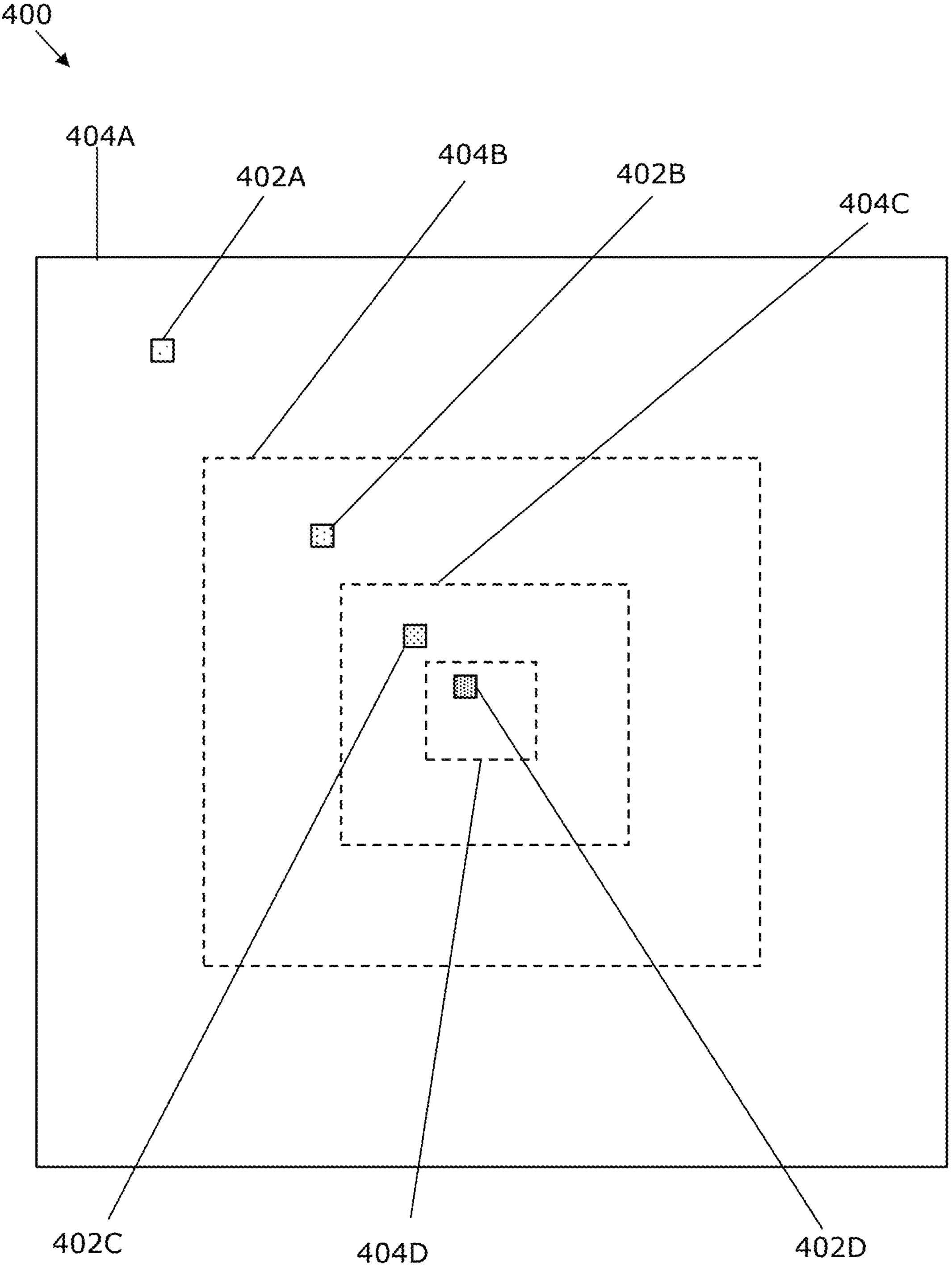
FIG. 4 illustrates an exemplary image that includes a set of pixels in a set of pixel regions where colors associated with pixels in different regions are mutually affected by each other, in accordance with embodiments of the present disclosure.

Referring to FIG. 4, illustrated is an exemplary image 400 that includes a set of pixels 402A-402D in a set of pixel regions 404A-404D where colors associated with pixels in different regions are mutually affected by each other, in accordance with embodiments of the present disclosure. The set of pixels 402A-402D includes four pixels, viz., a first pixel 402A, a second pixel 402B, a third pixel 402C, and a fourth pixel 402D. The set of pixel regions 404A-404D includes four pixel regions, viz., a first pixel region 404A, a second pixel region 404B, a third pixel region 404C, and a fourth pixel region 402D. The set of pixels 402A-402D are parts of a geometric series of pixels that converge at an optical axis of the image 400. The first pixel 402A of the geometric series of pixels belongs to the first pixel region 404A, the second pixel 402B of the geometric series of pixels belongs to the second pixel region 404B, the third pixel 402C of the geometric series of pixels belongs to the third pixel region 404C, and the fourth pixel 402D of the geometric series of pixels belongs to the fourth pixel region 404D.

Based on an analysis of the image 400, the processor 206 identifies that the first pixel region 404A and a color associated with the first pixel 402A is not susceptible to ghosting. Based on the analysis, the processor 206 further identifies that each of the second pixel region 404B, the third pixel region 404C, and the fourth pixel region 404D are susceptible to ghosting. Thus, the second pixel 402B, the third pixel 402C, and the fourth pixel 402D, is susceptible to ghosting. This is because the set of pixels 402A-402D are parts of the geometric series of pixels whereby the color associated with the first pixel 402A influences a color associated with the second pixel 402B, the color associated with the second pixel 402B influences a color associated with the third pixel 402C, and the color associated with the third pixel 402C influences a color associated with the fourth pixel 402D.

The second pixel 402B is susceptible to ghosting based on a leakage of colors associated with one or more pixels surrounding the first pixel 402A. The extent (percentage) of leakage may be determined based on a first light leakage coefficient determined for the first pixel region 404A. The third pixel 402C is susceptible to ghosting based on a leakage of colors associated with one or more pixels surrounding the second pixel 402B. The extent of leakage may be determined based on a second light leakage coefficient determined for the second pixel region 404B. The fourth pixel 402D is susceptible to ghosting based on a leakage of colors associated with one or more pixels surrounding the third pixel 402C. The extent of leakage may be determined based on a third light leakage coefficient determined for the third pixel region 404C.

The processor 206 calculates a compensatory color value for each of the second pixel 402B, the third pixel 402C, and the fourth pixel 402D. Based on the compensatory color value calculated for each of the second pixel 402B, the third pixel 402C, and the fourth pixel 402D, the colors associated with each of the second pixel 402B, the third pixel 402C, and the fourth pixel 402D (in each of the identified second pixel region 404B, the third pixel region 404C, and the fourth pixel region 404D) are adjusted such that ghosting artifacts affecting each of the second pixel 402B, the third pixel 402C, and the fourth pixel 402D are compensated.

FIG. 4 is merely an example, which should not unduly limit the scope of the claims herein.

Figures 5A, 5B, 5C, 5D:
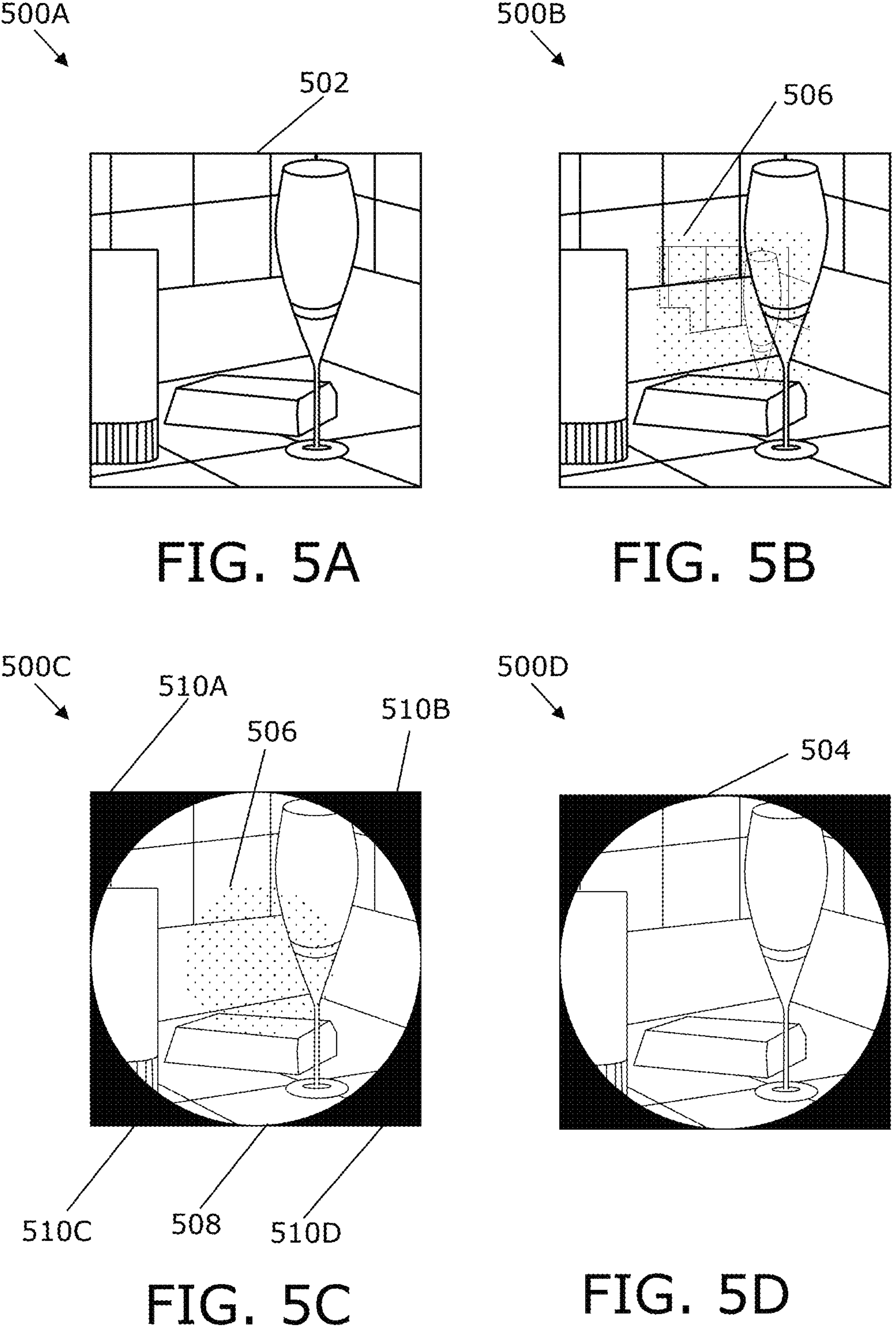
FIGS. 5A, 5B, 5C, and 5D illustrate exemplary stages involved in applying compensatory color values on pixels of an input image for obtaining an adjusted image, in accordance with embodiments of the present disclosure.

Referring to FIGS. 5A, 5B, 5C, and 5D, illustrated are exemplary stages 500A-500D involved in applying compensatory color values on pixels of an input image 502 for displaying an adjusted image 504 that is close to the input image 502, in accordance with embodiments of the present disclosure. The exemplary stages 500A-500D include a first stage 500A, a second stage 500B, a third stage 500C, and a fourth stage 500D. As illustrated in FIG. 5A, at the first stage 500A, the input image 502 is received.

As illustrated in FIG. 5B, at the second stage 500B, the input image 502 is analyzed. Based on the analysis, it is identified that pixels in a pixel region 506 (depicted as a dotted area) in the input image 502 may be susceptible to ghosting if visualized. The ghosting may be due to leakage of light (color) associated with pixels surrounding the pixel region 506. The light leaks into the pixel region 506 and affects the colors associated with pixels in the pixel region 506. To mitigate errors in color associated with each pixel in the pixel region 506 due to the ghosting, a compensatory color value is calculated for each pixel in the pixel region 506.

As illustrated in FIG. 5C, at the third stage 500C, the compensatory color value is applied on each pixel in the pixel region 506 to generate an adjusted image 508. The application leads to an adjustment of the color associated with each pixel in the pixel region 506. The adjusted image 508 is rendered on the display panel 208 of the display apparatus 204. Furthermore, non-visible areas 510A-510D of the display panel 208 are masked to black. The non-visible areas 510A-510D refer to areas of the display panel 208 where the user is least likely to direct his/her gaze. The rendering of the adjusted image 508 on the display panel 208 results in the user viewing the image 504, which may be close/similar to the input image 502.

As illustrated in FIG. 5D, at the fourth stage 500D, ghosting may be applied on the adjusted image 508 after the rendering. The application of the ghosting on the pixels in the pixel region 506 of the (rendered) adjusted image 508 image (due to leakage of light associated with pixels surrounding the pixel region 506) leads to compensation of ghosting artifacts that may be visualized after the rendering of the adjusted image 508. The calculation of the compensatory color values for each pixel in the pixel region 506 and the application of the compensatory color value on each pixel in the pixel region 506 leads to the adjustment of colors associated with each pixel in the pixel region 506. The adjustment of colors is such that the application of ghosting on the pixels in the pixel region 506 leads to compensation of the ghosting artifacts.

FIGS. 5A, 5B, 5C, and 5D are merely examples, which should not unduly limit the scope of the claims herein.

The invention claimed is:

1. A method for compensating for ghosting artifacts in a display apparatus, comprising:

receiving an input image intended for display on a display panel within the display apparatus;

analyzing the input image to identify pixel regions susceptible to ghosting based on proximity to an optical axis of a lens unit in the display apparatus;

applying a defocus blur sequentially across the identified pixel regions of the input image, aligned with pixel series, including a sequence of pixels affected by each other due to propagation of light through the lens unit, starting from a periphery towards a center of the display panel;

calculating a compensatory color value for each pixel in the identified pixel regions using a convolution process, wherein the compensatory color value incorporates effects of light leakage from one or more surrounding pixels on the corresponding pixel;

applying the compensatory color values to the corresponding pixels in the identified pixel regions to generate an adjusted image; and displaying the adjusted image on the display panel of the display apparatus.

2. The method of claim 1, wherein analyzing the input image comprises determining a light leakage coefficient for each pixel region, with the light leakage coefficient representing a percentage of light leaking out of the lens unit to cause ghosting, and wherein the convolution process involves determining an effect of leaked light for each pixel from the one or more surrounding pixels based on a sum of original color value for the corresponding pixel as per the input image and a proportion of color values of the one or more surrounding pixels influenced by the light leakage coefficients thereof.

3. The method of claim 1 further comprising refining the adjusted image by repeating the convolution process and compensatory color value calculation steps for multiple iterations, wherein the iterations are performed until a loss function between consecutive iterations falls below a predefined threshold.

4. The method of claim 1, further comprising prioritizing calculating and applying of the compensatory color values to the pixels corresponding to a user's gaze over peripheral regions.

5. The method of claim 1, further comprising masking non-visible areas of the display panel to black.

6. The method of claim 1, wherein if the determined compensatory color value for a pixel in a pixel series, including a sequence of pixels affected by each other due to propagation of light through the lens unit, results in a color outside of a displayable color range of the display panel, further comprising redistributing excess color values by increasing a brightness of adjacent pixels within the same pixel series.

7. The method of claim 1 further comprising implementing a neural network configured to process each pixel series independently to approximate the compensatory color value for each pixel in the identified pixel regions.

8. A system for compensating for ghosting artifacts in a display apparatus, the display apparatus comprising a display panel configured to display an image and a lens unit configured to focus light from the display panel to a user's eye, the lens unit being characterized by an optical axis, the system comprising a processor configured to:

receive an input image intended for display on the display panel within the display apparatus;

analyze the input image to identify pixel regions susceptible to ghosting based on proximity to the optical axis of the lens unit in the display apparatus;

applying defocus blur sequentially across the identified pixel regions of the input image, aligned with pixel series, including a sequence of pixels affected by each other due to propagation of light through the lens unit, starting from a periphery towards a center of the display panel;

calculate a compensatory color value for each pixel in the identified pixel regions using a convolution process, wherein the compensatory color value incorporates effects of light leakage from one or more surrounding pixels on the corresponding pixel;

apply the compensatory color values to the corresponding pixels in the identified pixel regions to generate an adjusted image; and display the adjusted image on the display panel of the display apparatus.

9. The system of claim 8, wherein the processor is further configured to refine the adjusted image by repeating the convolution process and compensatory color value calculation steps for multiple iterations, wherein the iterations are performed until a loss function between consecutive iterations falls below a predefined threshold.

10. The system of claim 8, wherein the processor is further configured to prioritize calculating and applying of the compensatory color values to the pixels corresponding to a user's gaze over peripheral regions.

11. The system of claim 8, wherein if the determined compensatory color value for a pixel in a pixel series, including a sequence of pixels affected by each other due to propagation of light through the lens unit, results in a color outside of a displayable color range of the display panel, the processor is further configured to redistribute excess color values by increasing a brightness of adjacent pixels within the same pixel series.

12. The system of claim 8, wherein the processor is further configured to implement a neural network configured to process each pixel series independently to approximate the compensatory color value for each pixel in the identified pixel regions.

13. The system of claim 8, wherein the display apparatus is a head-mounted display (HMD) as part of an extended reality (XR) system.

* * * * *